United States Patent
Tian et al.

(10) Patent No.: US 11,429,680 B2
(45) Date of Patent: Aug. 30, 2022

(54) TOPIC SUBSCRIPTION METHOD AND APPARATUS, AND STORAGE MEDIUM

(71) Applicant: BEIJING BAIDU NETCOM SCIENCE AND TECHNOLOGY CO., LTD., Beijing (CN)

(72) Inventors: Hao Tian, Beijing (CN); Daren Li, Beijing (CN); Bo Huang, Beijing (CN); Dai Dai, Beijing (CN); Chengxiang Liu, Beijing (CN); Anjun Wei, Beijing (CN); Kexin Ren, Beijing (CN); Haiguang Yuan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 757 days.

(21) Appl. No.: 16/234,337

(22) Filed: Dec. 27, 2018

(65) Prior Publication Data
US 2019/0155856 A1     May 23, 2019

Related U.S. Application Data

(63) Continuation of application No. PCT/CN2016/097477, filed on Aug. 31, 2016.

(30) Foreign Application Priority Data

Jun. 27, 2016 (CN) .......................... 201610481888.4

(51) Int. Cl.
*G06F 16/00* (2019.01)
*G06F 16/953* (2019.01)
(Continued)

(52) U.S. Cl.
CPC ............ *G06F 16/953* (2019.01); *G06F 16/00* (2019.01); *G06F 16/1748* (2019.01); *G06F 16/313* (2019.01); *G06F 16/3347* (2019.01)

(58) Field of Classification Search
CPC .... G06F 16/00; G06F 16/1748; G06F 16/313; G06F 16/3347; G06F 16/953
(Continued)

(56) References Cited

U.S. PATENT DOCUMENTS

| 2010/0057716 | A1 | 3/2010 | Stefik et al. |
| 2010/0205541 | A1* | 8/2010 | Rapaport ............. G06F 16/285 715/753 |

(Continued)

FOREIGN PATENT DOCUMENTS

| CN | 102129452 A | 7/2011 |
| CN | 102945244 A | 2/2013 |

(Continued)

OTHER PUBLICATIONS

International Search Report and Written Opinion for PCT/CN2016/097477, dated Mar. 15, 2017.

*Primary Examiner* — Vincent F Boccio
(74) *Attorney, Agent, or Firm* — Marshall, Gerstein & Borun LLP

(57) ABSTRACT

Embodiments of the present disclosure disclose a method and apparatus for subscribing to a topic. The method includes: matching a persistent topic for a retrieval keyword based on the retrieval keyword of a user combined with at least one of historical behavior or a subscription record of the user; returning the persistent topic to a client for display, so that the user performs subscription; and saving the persistent topic subscribed to by the user, and when a matching resource corresponding to the persistent topic subscribed to by the user is updated, recommending the updated matching resource to the user. Since a recommendation strategy can be timely adjusted according to real-time behavior of a user combined with historical behavior, the probability of hitting a topic of interest to the user is increased.

21 Claims, 11 Drawing Sheets

(51) Int. Cl.
　　　*G06F 16/33*　　　(2019.01)
　　　*G06F 16/31*　　　(2019.01)
　　　*G06F 16/174*　　(2019.01)

(58) Field of Classification Search
　　　USPC .......................................................... 707/726
　　　See application file for complete search history.

(56) References Cited

U.S. PATENT DOCUMENTS

| | | | |
|---|---|---|---|
| 2012/0041941 A1* | 2/2012 | King | G06Q 30/04 707/711 |
| 2014/0059452 A1* | 2/2014 | Kao | H04L 65/403 715/753 |
| 2014/0223372 A1* | 8/2014 | Dostie | G06F 3/0482 715/813 |
| 2015/0074042 A1* | 3/2015 | Teytelman | G06F 16/93 707/608 |
| 2016/0019217 A1* | 1/2016 | Reblitz-Richardson | G06F 16/444 707/731 |

FOREIGN PATENT DOCUMENTS

| | | |
|---|---|---|
| CN | 103177024 A | 6/2013 |
| CN | 103577478 | 2/2014 |
| CN | 103577501 | 2/2014 |
| CN | 103593418 A | 2/2014 |
| CN | 104636402 A | 5/2015 |
| CN | 104869439 A | 8/2015 |
| CN | 105930539 | 9/2016 |

\* cited by examiner

TOPIC SUBSCRIPTION METHOD AND APPARATUS, AND STORAGE MEDIUM

CROSS-REFERENCE TO RELATED APPLICATIONS

This is a continuation of International Application PCT/CN2016/097477, with an international filing date of Aug. 31, 2016, which claims the priority from Chinese Application No. 201610481888.4, filed on Jun. 27, 2016, entitled "Method and Apparatus for Subscribing to Topic," the contents of which are incorporated herein by reference in their entireties.

TECHNICAL FIELD

Embodiments of the present disclosure relate to the Internet technology, specifically to a method and apparatus for subscribing to a topic.

BACKGROUND

The method for subscribing to a topic in the existing technology is mainly divided into two types, one is based on resources, and the other is based on subscription needs, which are respectively introduced as follows.

The resource-based recommendation method uses the application "Today's headlines" as an example. The application "Today's headlines" guesses a user's interests and implicitly recommends related resources by recording the user's daily clicked resources. For example, if a user frequently clicks on NBA-related articles, the user may find that other NBA-related articles increase significantly during the continuous use of the "Today's headlines." The resources of the "Today's Headlines" are mainly provided by cooperating medias. Technically, through certain filtering, resources fulfilling the requirements are filtered, and the similarity between the resources is calculated to perform the implicit recommendation. "Today's headlines" also support the function of subscription. In an approach, the user mainly subscribes to a topic through an entity word. The granularity of the needs in this method is too coarse, and the probability that the articles in the subscription hitting the real needs of the user is low. In another approach, the user subscribes to a topic through a media public account, which is too dependent on the media public account and cannot hit the needs of a certain user continuously.

The subscription need based recommendation method uses the application "Jike" as an example. As shown in FIG. 1, on the homepage of "Jike," there are some recommendations for need topic subscriptions. Users may search by category or directly search for topics of interest to themselves. After the users subscribe to certain need topics, "Jike" reminds the users that there are new resources for these subscriptions by pushing. The users may also click on "message" to check the latest resources in the need subscriptions, as shown in FIG. 2.

In summary, both resource-based and subscription need based methods have the same drawbacks, that is, the user's own attributes or behaviors are not considered, and the true points of interest of the user are not well represented.

SUMMARY

The main objective of embodiments of the present disclosure is to provide a method, apparatus and storage medium for subscribing to a topic to increase the probability of hitting a topic of interest to a user.

In a first aspect, the embodiments of the present disclosure provide a method for subscribing to a topic. The method includes: matching a persistent topic for a retrieval keyword based on the retrieval keyword of a user combined with at least one of historical behavior or a subscription record of the user; returning the persistent topic to a client for display, for the user to subscribe; and saving the persistent topic subscribed by the user, and recommending an updated matching resource to the user when a matching resource corresponding to the persistent topic subscribed by the user is updated.

In a second aspect, the embodiments of the present disclosure further provide an apparatus for subscribing to a topic. The apparatus includes: a topic matching module, configured to match a persistent topic for a retrieval keyword based on the retrieval keyword of a user combined with at least one of historical behavior or a subscription record of the user; a topic display module, configured to return the persistent topic to a client for display, for the user to subscribe; and a resource recommendation module, configured to save the persistent topic subscribed by the user, and recommend an updated matching resource to the user when a matching resource corresponding to the persistent topic subscribed by the user is update.

In a third aspect, the embodiments of the present disclosure further provide a storage medium containing computer executable instructions, the computer executable instructions, when executed by a computer processor, are used for implementing a method for subscribing to a topic, and the method includes: matching a persistent topic for a retrieval keyword based on the retrieval keyword of a user combined with at least one of historical behavior or a subscription record of the user; returning the persistent topic to a client for display, for the user to subscribe; and saving the persistent topic subscribed by the user, and recommending an updated matching resource to the user when a matching resource corresponding to the persistent topic subscribed by the user is updated.

By matching a persistent topic based on the retrieval keyword of a user combined with at least one of historical behavior or a subscription record of the user, returning the persistent topic to a client for display, for the user to subscribe, and recommending an updated matching resource to the user when a matching resource corresponding to the persistent topic subscribed by the user is updated, the method, apparatus and storage medium for subscribing to a topic provided by the embodiments of the present disclosure can timely adjust a recommendation strategy according to real-time behavior of a user combined with historical behavior, thereby increasing the probability of hitting a topic of interest to the user.

BRIEF DESCRIPTION OF THE DRAWINGS

In order to illustrate the technical solution of the embodiments of the present disclosure more clearly, the accompanying drawings used in the description of the embodiments will be briefly described below. Of course, the accompanying drawings in the following description are only some embodiments of the present disclosure. Those skilled in the art can also modify and replace these accompanying drawings without any creative effort.

DETAILED DESCRIPTION OF EMBODIMENTS

The technical solution in the embodiments of the present disclosure is clearly and completely described in the following with reference to the accompanying drawings. It is apparent that the described embodiments are part of the embodiments of the present disclosure, rather than all the embodiments, and are for illustrating the principles of the present disclosure, rather than limiting the present disclosure to these specific embodiments. All other embodiments obtained by those skilled in the art based on the embodiments of the present disclosure without creative efforts are within the scope of the present disclosure.

Embodiment 1

Figure 1:
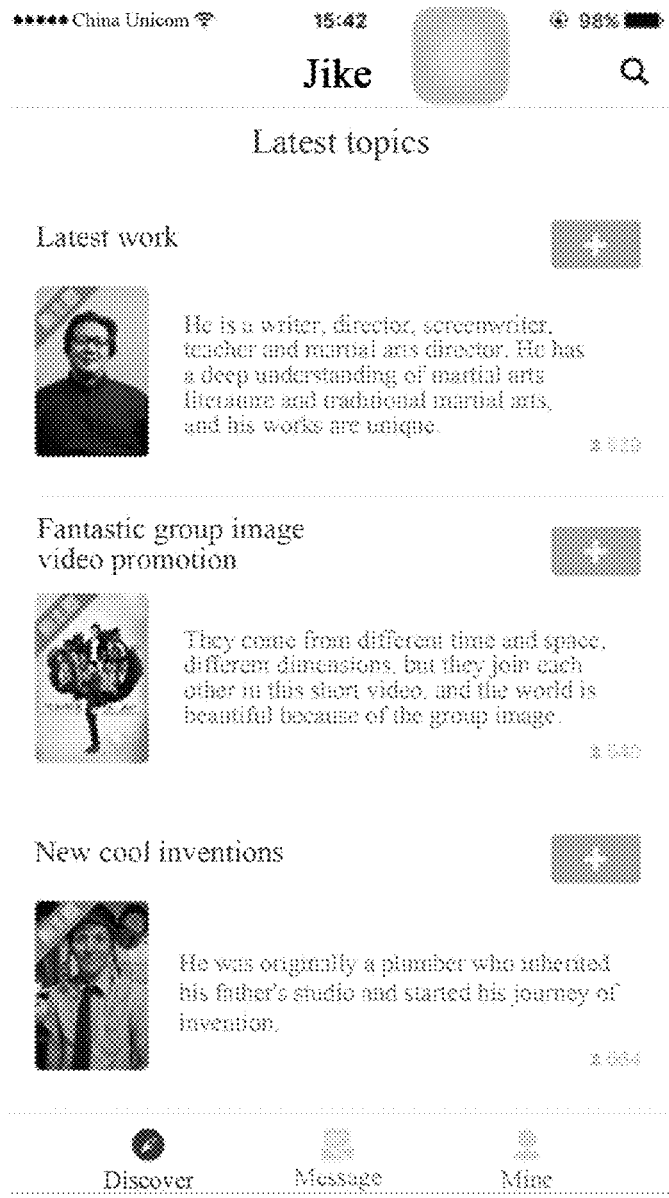
FIG. 1 is an exemplary diagram of a subscription page of "Jike" in the existing technology.
Figure 2:
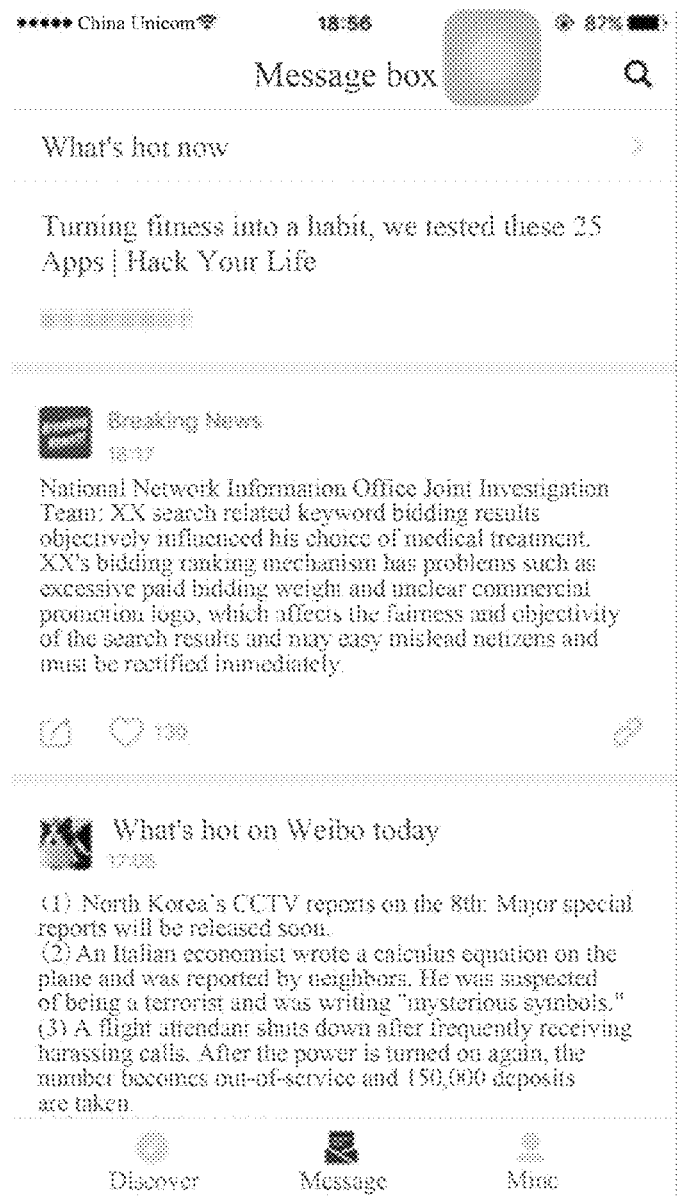
FIG. 2 is an exemplary diagram of a message pushed by "Jike" in the existing technology.
Figure 3:
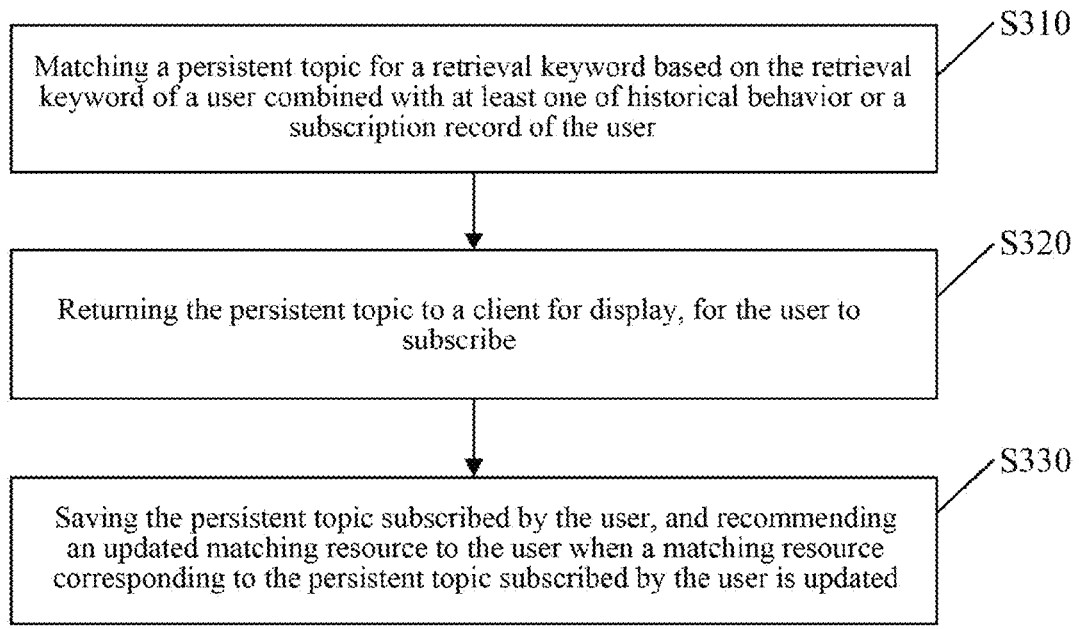
FIG. 3 is a flowchart of a method for subscribing to a topic according to Embodiment 1 of the present disclosure.

FIG. 3 is a flowchart of a method for subscribing to a topic according to Embodiment 1 of the present disclosure. The present embodiment is applicable to the case of matching the topic based on historical behavior of the user and providing the topic for user subscription. The method may be performed by an apparatus for subscribing to a topic, and the apparatus for subscribing to a topic may be configured in a server. The method specifically includes the following steps.

S310, matching a persistent topic for a retrieval keyword based on the retrieval keyword of a user combined with at least one of historical behavior or a subscription record of the user.

When the user uses a topic retrieval application (such as a Baidu's "Duer" star gossip service), a retrieval keyword may be inputted to retrieve related topics and corresponding resources. Upon receiving the retrieval keyword inputted by the user, in order to better hit the user's point of interest, the retrieval keyword is combined with at least one of the user's historical behavior (such as the user's clicked resources and the user's search history, that is, the user's session history) or a subscription record of the user (subscribed topics of the user) to match the retrieval keyword with a persistent topic of interest to the user. The persistent topic is a topic of continuous needs for the user. The matching persistent topic includes at least one persistent topic.

When matching a persistent topic, it is also possible to match a persistent topic related to the retrieval keyword inputted by the user as a related recommendation. There are two cases related to the retrieval keyword: subject-related or keyword-related. For example, when the user searches for "Lu Han's girlfriend," the persistent topic meeting the user's needs is first accurately matched, and then other subject-related topics such as "Lu Han of Running Man Season 4" and "Wong Cho Lam's Height" (who also participating the Running Man series with Lu Han, a friend of Lu Han) are recommended, and other keyword-related topics such as "Wu YiFan's girlfriend," and "Ryan Zheng's girlfriend" are recommended. These related recommendations help the user discover secondary needs next to the major needs, which allow more needs and their associated quality resources to be seen by the user, inspiring the user's other potential needs.

The persistent topic includes at least one directly or indirectly related user query within a set time interval, and is a topic stored in a persistent topic retrieval library.

S320, returning the persistent topic to a client for display, for the user to subscribe.

The persistent topic is returned to the client of the user and displayed on the display interface of the client. If the user clicks on the persistent topic, the matching resource corresponding to the persistent topic is queried in a pre-established persistent topic retrieval library, and returned to the client for display, for the user to browse the matching resource corresponding to the persistent topic.

S330, saving the persistent topic subscribed by the user, and recommending an updated matching resource to the user when a matching resource corresponding to the persistent topic subscribed by the user is updated.

The persistent topic subscribed by the user is received and saved under the account of the user. When there is a resource update, an association between the resource and the persistent topic in the persistent topic retrieval library is established. When the resource is determined to be a matching resource corresponding to the persistent topic subscribed by the user, the updated matching resource may be pushed to the client in the form of a message.

Figure 4A:
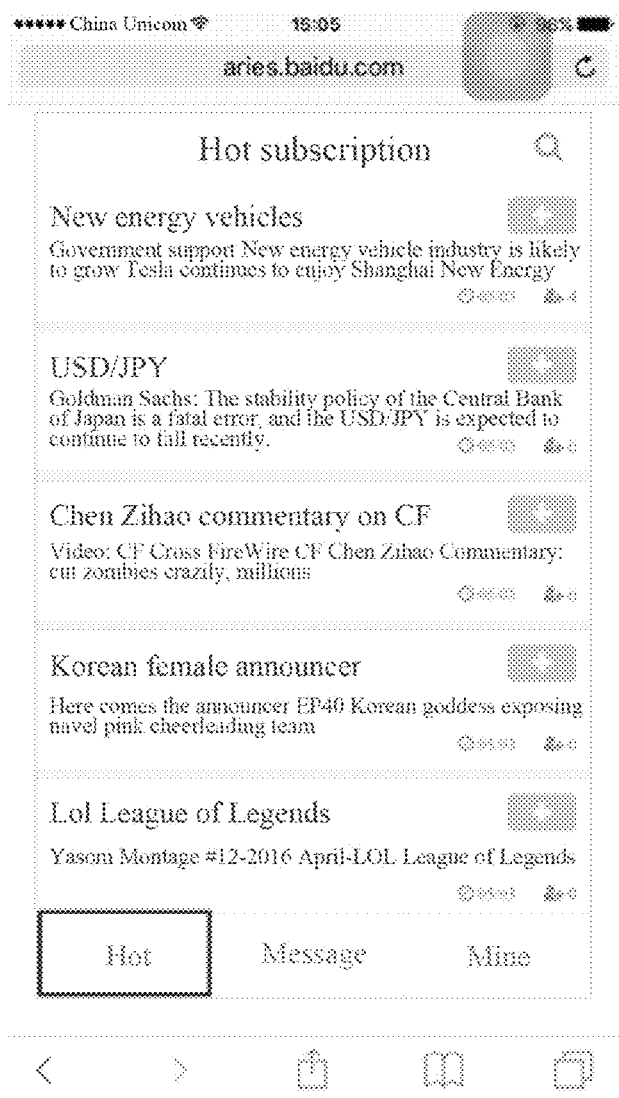
FIGS. 4a-4c are exemplary diagrams of subscription pages in the method for subscribing to a topic according to embodiments of the present disclosure.
Figure 4B:
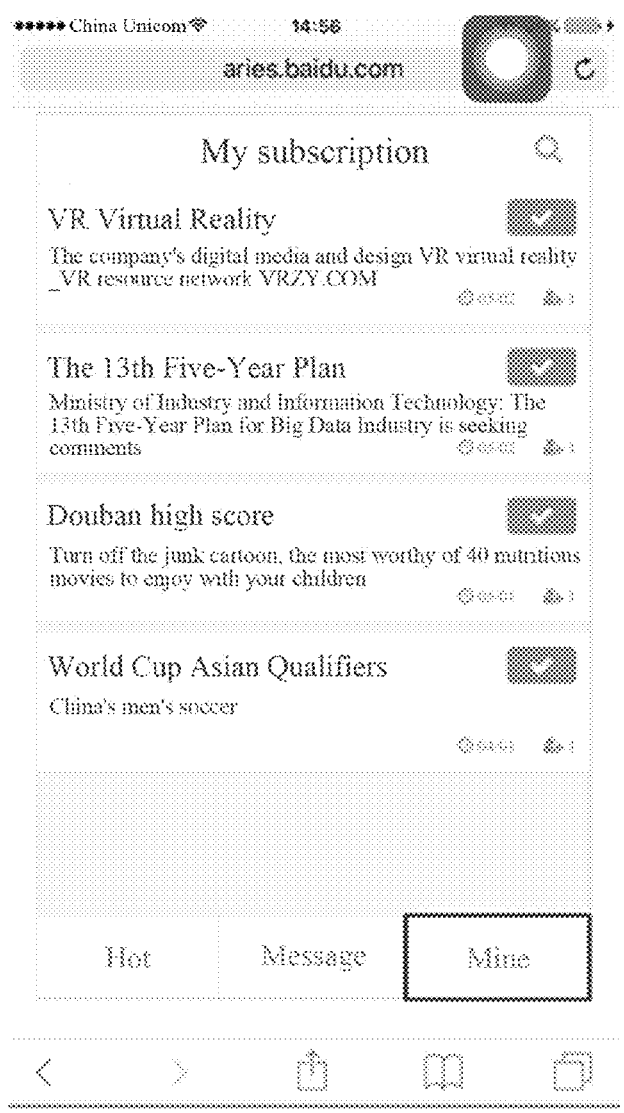
Figure 4C:

FIGS. 4a-4c are exemplary diagrams of subscription pages in the method for subscribing to a topic according to embodiments of the present disclosure. As shown in FIG. 4a, among popular subscriptions on the subscription page, each subscription is composed of a persistent topic and the title of a corresponding latest resource, the subscription may also include an image, and the subscription page also supports the user to search for subscription content he/she wants. As shown in FIG. 4b, when the user subscribe to some of these persistent topics, it is possible to click "mine" to view the subscribed persistent topics. As shown in FIG. 4c, the user may also click "message" to view the latest resources of the subscribed persistent topics in a Pinterest style.

By matching a persistent topic based on the retrieval keyword of a user combined with at least one of historical behavior or a subscription record of the user, returning the persistent topic to a client for display, for the user to subscribe, and recommending an updated matching resource to the user when a matching resource corresponding to the persistent topic subscribed by the user is updated, the technical solution provided by the present embodiment can timely adjust a recommendation strategy based on real-time behavior of a user combined with historical behavior, thereby increasing the probability of hitting a topic of interest to the user and improving user experience in discovering more persistent topics.

Based on the above technical solution, the method for subscribing to a topic further preferably includes: determining a persistent topic to be recommended to the user based on the historical behavior and a subscription behavior for the persistent topic of the user, and recommending the persistent topic to the user.

A persistent topic to be recommended to an active user is determined and recommended to the active user based on the historical behavior of the active user and the number of users subscribed to the persistent topic among all the users. When it is detected that the user clicks on the persistent topic, the matching resource corresponding to the persistent topic is returned to the client for display. For example, when the active user just opens the application, the corresponding persistent topic is recommended to the active user based on the historical behavior of the active user and the number of users subscribed to the persistent topic. The purpose of recommending to the user a topic of interest to the user and high popularity is achieved.

On the basis of the above technical solution, the matching a persistent topic for a retrieval keyword based on the retrieval keyword of a user combined with at least one of historical behavior or a subscription record of the user preferably includes: determining the persistent topic for the retrieval keyword based on the retrieval keyword of the user combined with at least one of the historical behavior or the subscription record of the user; and sorting the persistent topic based on a click record of the persistent topic and the historical behavior of the user.

First, the persistent topic matching the retrieval keyword is determined based on the retrieval keyword of the user combined with at least one of the historical behavior or the subscription record of the user, and then the persistent topic is sorted based on the click record of the determined persistent topic and the historical behavior of the user, and persistent topics with a higher number of click records and closest to the historical behavior of the user are ranked in front, so that the user may be recommended with the persistent topics with high popularity and interest to the user according to the sorting result, which further increases the probability of hitting a topic of interest to the user.

Embodiment 2

Figure 5:
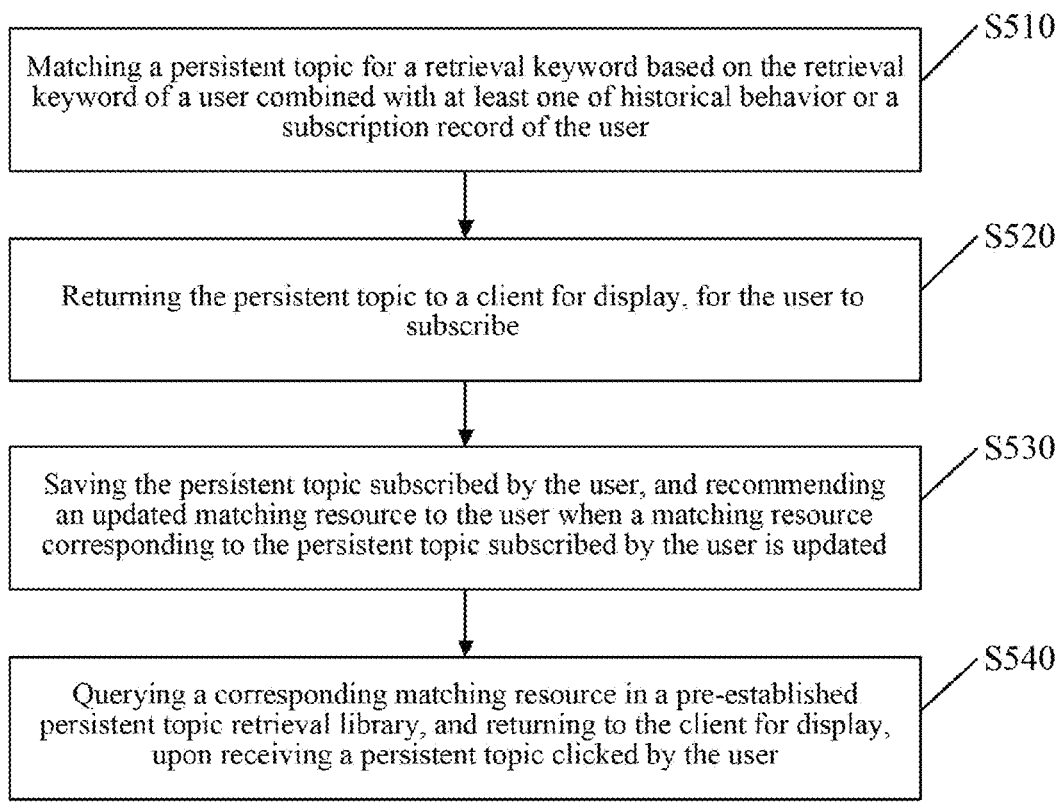
FIG. 5 is a flowchart of a method for subscribing to a topic according to Embodiment 2 of the present disclosure.

FIG. 5 is a flowchart of a method for subscribing to a topic according to Embodiment 2 of the present disclosure. The present embodiment is optimized on the basis of the above embodiment, and further increases "querying a corresponding matching resource in a pre-established persistent topic retrieval library, and returning to the client for display, upon receiving a persistent topic clicked by the user," the method specifically includes the following steps.

S510, matching a persistent topic for a retrieval keyword based on the retrieval keyword of a user combined with at least one of historical behavior or a subscription record of the user.

S520, returning the persistent topic to a client for display, for the user to subscribe.

S530, saving the persistent topic subscribed by the user, and recommending an updated matching resource to the user when a matching resource corresponding to the persistent topic subscribed by the user is updated.

S540, querying a corresponding matching resource in a pre-established persistent topic retrieval library, and returning to the client for display, upon receiving a persistent topic clicked by the user.

Here, the persistent topic retrieval library includes an association relationship between a persistent topic and a matching resource. The persistent topic in the persistent topic retrieval library is a user query meeting a preset condition mined based on the retrieval logs of all users.

When displaying the persistent topic in the client (by returning the persistent topic matching the retrieval keyword to the client for display or displaying the persistent topic subscribed by the user), the client detects the persistent topic clicked by the user in real time. When the persistent topic clicked by the user is detected, the client sends the persistent topic clicked by the user to the server, and the server queries the matching resource corresponding to the persistent topic in the pre-established persistent topic retrieval library, and returns the queried matching resource to the client for display.

Here, the querying a corresponding matching resource in a pre-established persistent topic retrieval library, and returning to the client for display, upon receiving a persistent topic clicked by the user preferably includes: querying the corresponding matching resource in the pre-established persistent topic retrieval library, upon receiving the persistent topic clicked by the user; sorting the matching resource based on a click record and a resource attribute of the matching resource, and the historical behavior of the user; and returning the matching resource to the client for display according to a sorting result.

Upon receiving the persistent topic clicked by the user, the matching resource corresponding to the persistent topic is queried in the pre-established persistent topic retrieval library. The matching resource is sorted in descending order based on the respective click record, resource attribute (such as a value score) of the queried matching resource, and the historical behavior of the user. The matching resource is returned to the client for display according to the sorting result. Therefore, the user may first acquire the resources with high popularity, good quality and of interest to the user, and the probability of hitting the resource of interest to the user is further increased.

Figure 6:
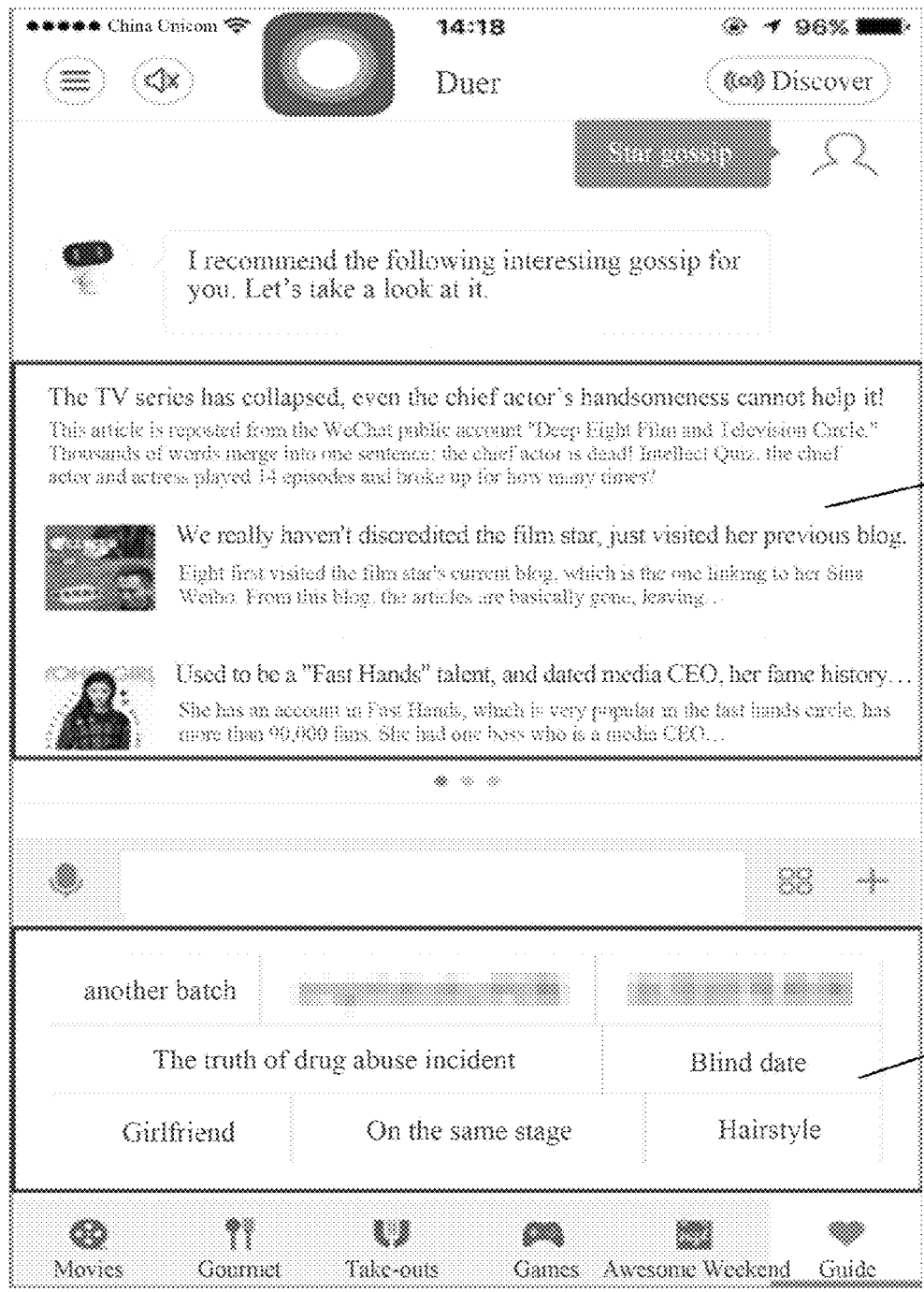
FIG. 6 is an exemplary diagram of a matching resource and a corresponding persistent topic recommended for a user based on a retrieval keyword of the user in the method for subscribing to a topic according to the embodiments of the present disclosure.
Figure 7:
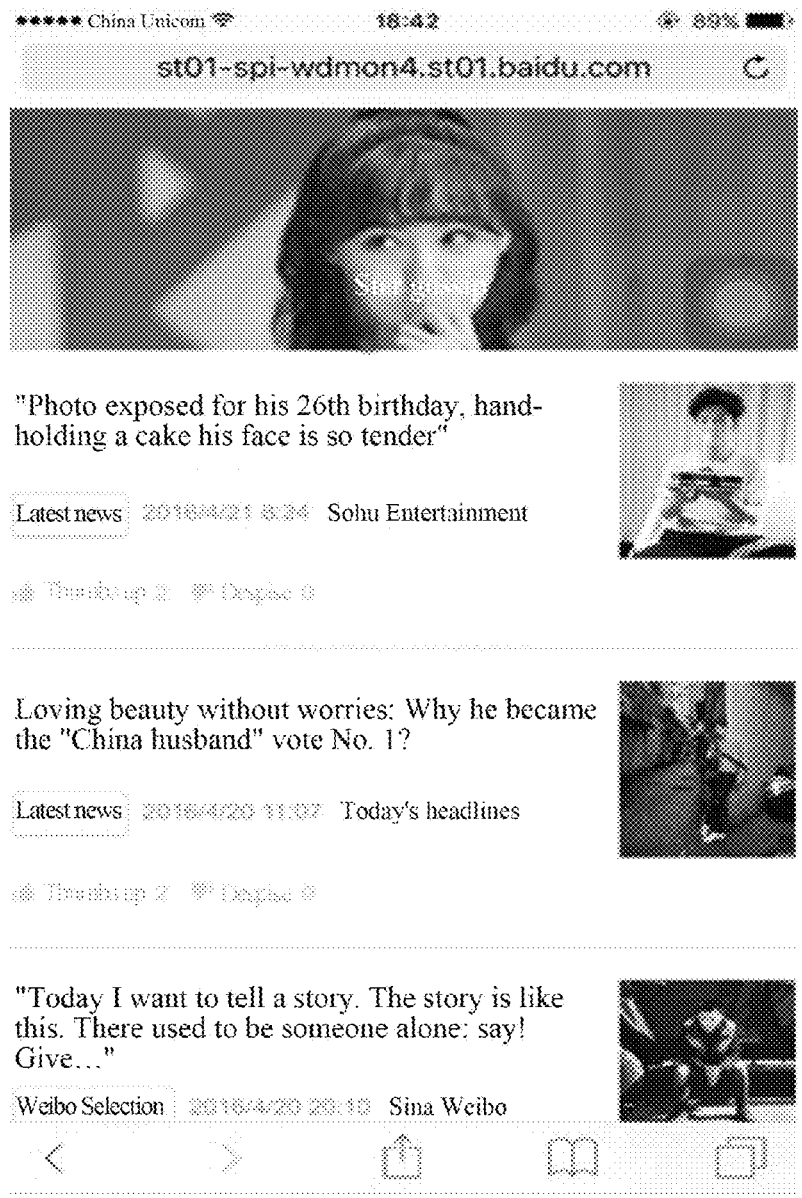
FIG. 7 is an exemplary diagram of an updated matching resource in the method for subscribing to a topic according to the embodiments of the present disclosure.

The method for subscribing to a topic provided by the embodiments of the present disclosure may also directly recommend the closest matching resource and the related persistent topic to the user based on the retrieval keyword of the user. FIG. 6 is an exemplary diagram of a matching resource and a corresponding persistent topic recommended for a user based on a retrieval keyword of the user in the method for subscribing to a topic according to the embodiments of the present disclosure. As shown in FIG. 6, when the user inputs "star gossip," some of satisfaction resources 610 of popular stars are first recommended, and then a persistent topic 620 of a popular star having persistent needs is recommended. When the persistent topic "star gossip" is updated, related resources may be browsed through the middle page shown in FIG. 7. FIG. 7 is an exemplary diagram of an updated matching resource in the method for subscribing to a topic according to the embodiments of the present disclosure.

On the basis of the above embodiment, the technical solution of the present embodiment queries the corresponding matching resource in the pre-established persistent topic retrieval library, and returns to the client for display, upon receiving the persistent topic clicked by the user, for the user to view the matching resource corresponding to the persistent topic.

Embodiment 3

Figure 8:
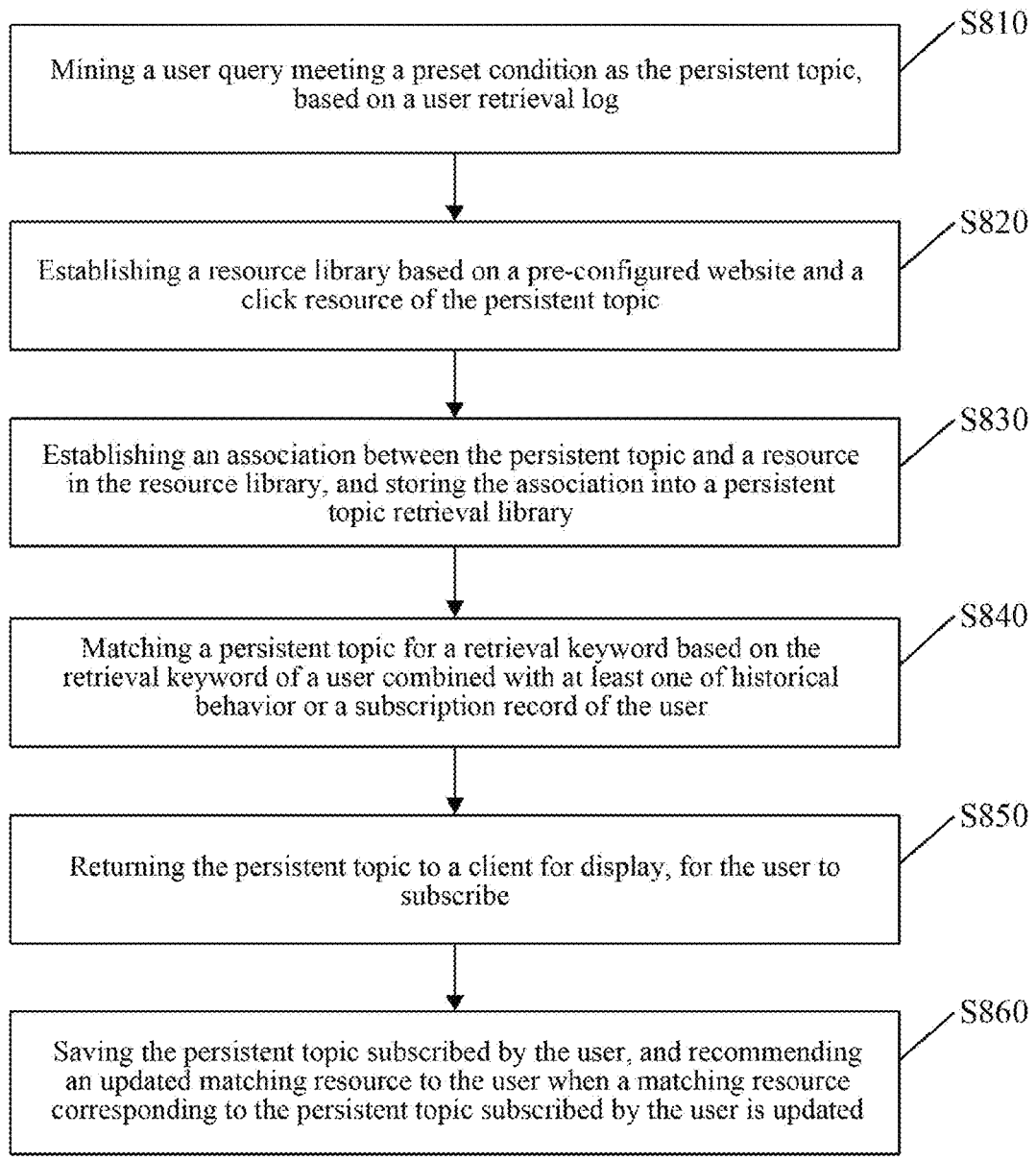
FIG. 8 is a flowchart of a method for subscribing to a topic according to Embodiment 3 of the present disclosure.

FIG. 8 is a flowchart of a method for subscribing to a topic according to Embodiment 3 of the present disclosure. The present embodiment is optimized on the basis of the above embodiment, and the operation of establishing a persistent topic retrieval library offline is added, and the method specifically includes the following steps.

S810, mining a user query meeting a preset condition as the persistent topic, based on a user retrieval log.

Here, the preset condition includes at least one of: the user query being continuously searched for a second preset number of days by over a preset number of people within a first preset number of days, or the user query including a preset keyword.

A user query meeting the preset condition is mined as the persistent topic based on a user retrieval log (such as the user retrieval log on the entire network of Baidu). For example, in two weeks, ten users searched for "Huang Xiaoming, Angelababy" for more than three consecutive days, then "Huang Xiaoming, Angelababy" is the persistent topic. A user query includes a preset keyword, such as "latest TV series" includes the preset keyword "latest," then the "latest TV series" is the persistent topic. The mined persistent topics are literally de-duplicated to form the result of all persistent topics. It is also possible to combine the latest retrieval logs of all users and routinely mine the latest persistent topic.

S820, establishing a resource library based on a pre-configured website and a click resource of the persistent topic.

The resource library is established through resource mining, and the source of the resource mining includes a pre-configured website and a click resource of the persistent topic. The pre-configured websites are some of the quality topic websites, such as "Today's headlines" and "Zhihu." The resource library is established by acquiring resources from these topical websites as well as the click resource of the persistent topic in the current website, and combining the resources of these two sources.

Here, the establishing a resource library based on a pre-configured website and a click resource of the persistent topic preferably includes: acquiring a resource in the pre-configured website and the click resource of the persistent topic as original resources; de-duplicating original resources having a consistent literal content based on titles and texts of the original resources, to obtain a resource; extracting a resource attribute of the resource, the resource attribute including a title, a summary, a map, and a value score; and storing the resource and the corresponding resource attribute into the resource library.

Here, the title in the resource attribute may be obtained by directly capturing the title of the resource. The summary is obtained by extracting the key sentence in the title and the text. The main image of the resource is determined based on the original image of the resource, and then the map is obtained by performing a preset sized cropping on the main image. The value score of the resource is mainly determined based on the information amount and depth of the resource content, and the source of the resource. Generally speaking, the value score of a resource with new, deep and rich content is relatively high. By literally de-duplicating the resources, obvious duplication of the resources may be prevented. By storing the resource and the corresponding resource attribute into the resource library, it is beneficial to follow up the resource attribute to establish an association between the resource and the persistent topic, and to improve an association speed.

S830, establishing an association between the persistent topic and a resource in the resource library, and storing the association into a persistent topic retrieval library.

The association between the persistent topic and the resource in the resource library is established based on the word distribution of the persistent topic and the word distribution of the resource in the resource library. By calculating the similarity between the word distribution of the persistent topic and the word distribution of the resource in the resource library, when the similarity is greater than a preset threshold, it is determined that the persistent topic is associated with the resource. The association between the persistent topic and the resource in the resource library is stored into the persistent topic retrieval library to recommend the persistent topic and the resource related to the persistent topic to the user.

S840, matching a persistent topic for a retrieval keyword based on the retrieval keyword of a user combined with at least one of historical behavior or a subscription record of the user.

S850, returning the persistent topic to a client for display, for the user to subscribe.

S860, saving the persistent topic subscribed by the user, and recommending an updated matching resource to the user when a matching resource corresponding to the persistent topic subscribed by the user is updated.

On the basis of the above technical solutions, the technical solution of the present embodiment automatically mines a persistent topic with potential persistent needs of the user based on the user retrieval log and the pre-configured website, and mines valuable resources. The association between the persistent topic and the resource is established and stored into the persistent topic retrieval library, so that it is convenient to recommend the persistent topic of interest to the user and the corresponding resource to the user subsequently. Moreover, through the topic mining, compared with the approach of manual organizing the topic in the existing technology, more persistent topics to subscribe to may be provided, and more related resources are provided to support and satisfy the user subscription.

Embodiment 4

Figure 9:
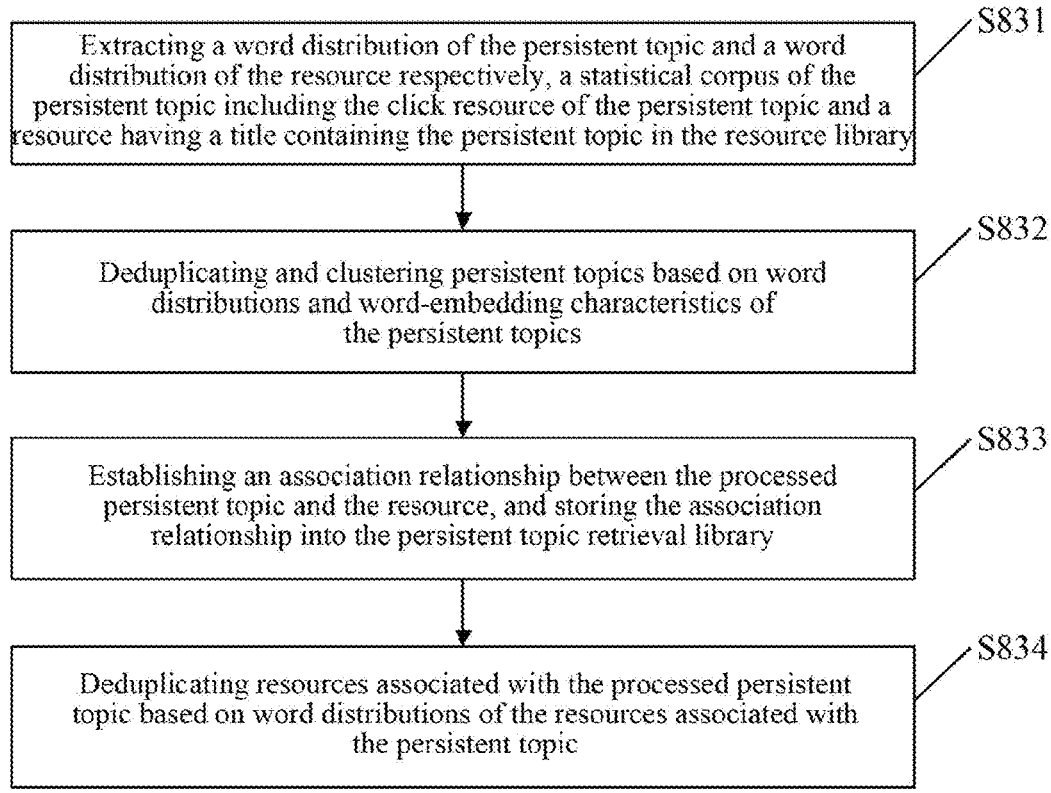
FIG. 9 is a flowchart of establishing an association between the persistent topic and a resource in a method for subscribing to a topic according to Embodiment 4 of the present disclosure.

FIG. 9 is a flowchart of establishing an association between the persistent topic and a resource in a method for subscribing to a topic according to Embodiment 4 of the present disclosure. On the basis of Embodiment 3, the present embodiment further optimizes the "establishing an association between the persistent topic and a resource in the resource library, and storing the association into a persistent topic retrieval library." As shown in FIG. 9, the "establishing an association between the persistent topic and a resource in the resource library, and storing the association into a persistent topic retrieval library" in the present embodiment specifically includes the following steps.

S831, extracting a word distribution of the persistent topic and a word distribution of the resource respectively, a statistical corpus of the persistent topic including the click resource of the persistent topic and a resource having a title containing the persistent topic in the resource library.

The word distribution of the resource is obtained by counting the word frequency in the title and the text of the resource.

S832, de-duplicating and clustering persistent topics based on word distributions and word-embedding characteristics of the persistent topics.

The similarity between the persistent topics is calculated based on word distributions and the word-embedding characteristics of the persistent topics, and the persistent topics are de-duplicated and clustered based on the similarity.

Here, the de-duplicating and clustering the persistent topics based on the word distributions and word-embedding characteristics of the persistent topics includes: calculating a similarity between the persistent topics based on word distributions and word-embedding characteristics of the persistent topics; reserving a persistent topic among persistent topics having similarities greater than a first preset threshold; and classifying persistent topics having the similarities greater than a second preset threshold and less than or equal to the first preset threshold into a category.

The first preset threshold is greater than the second preset threshold. Duplication is to remove the persistent topics having the similarities greater than the first preset threshold among the plurality of persistent topics, that is, to remove the persistent topics having the same semantic meaning, such as just keeping one of "Running Man Season 4" and "Running Brother Season 4." Clustering refers to classifying persistent topics having similar semantic meanings into one category such as "photos of Wang Yuan" and "street snaps of Wang Yuan." By de-duplicating and clustering the persistent topics based on the similarity between the persistent topics, the processing accuracy may be improved.

S833, establishing an association relationship between the processed persistent topic and the resource, and storing the association relationship into the persistent topic retrieval library.

An association relationship between the de-duplicated and clustered persistent topic and the resource is established, and the persistent topic, the resource and the corresponding association relationship are stored into the persistent topic retrieval library.

Here, the establishing an association relationship between the processed persistent topic and the resource, and storing the association relationship into the persistent topic retrieval library preferably includes: establishing an inverted index for a word distribution of the processed persistent topic; determining a candidate persistent topic corresponding to the resource based on the word distribution of the resource and the inverted index; calculating a similarity between a word distribution of a text of the resource and a word distribution of the candidate persistent topic; and defining a candidate persistent topic having the similarity greater than a preset threshold as the persistent topic associated with the resource, and storing the persistent topic into the persistent topic retrieval library.

Here, the inverted index is also often referred to as a reverse index, a placed file or a reverse file, is an index method used to store the mapping of the storage location of a word in a document or a set of documents under full-text search. Using the inverted index, a document list containing the word may be quickly acquired based on the word.

An inverted index for the word distribution of the processed persistent topic is established, that is, determining the position of the word in the persistent topic, and then retrieving a corresponding persistent topic in the inverted index based on the word distribution of the resource title and the word appearing frequently in the text, as the candidate persistent topic. The candidate persistent topic includes at least one item. The similarity between the distribution of the word appearing frequently in the resource text and the word distribution of the candidate persistent topic is calculated. The candidate persistent topic having a similarity greater than the preset threshold is defined as the persistent topic associated with the resource, and the association relationships between all the persistent topics and the resource are determined and stored into the persistent topic retrieval library. Through the above method, the association between the persistent topic and the resource is established, and the newly added resource can be linked to the persistent topic more timely, and then displayed online.

For example, for a resource titled "facial mask in the TV series Descendants of the Sun," the words "facial mask" and "moisturizing" frequently appear in the text. The similarities between these words and the persistent topic "Descendants of the Sun" are very low, so it is determined that the resource does not match the "Descendants of the Sun." For a resource titled "reviewing the classical scenes in the Descendants of the Sun," the words "the Descendants of the Sun," "Song Zhongji" and "Song Huiqiao" frequently appear in the text. The similarities between these words and the persistent topic "Descendants of the Sun" are relatively high, so it is determined that the resource matches the "Descendants of the Sun."

S834, de-duplicating resources associated with the processed persistent topic based on word distributions of the resources associated with the persistent topic.

Due to the large amount of resources, de-duplicating resources directly on full resources will be relatively expensive. Therefore, based on the matching results of the persistent topic and the resources, resources associated with each persistent topic are de-duplicated. When de-duplicating the resources associated with the each persistent topic, the similarities of the word distributions of the resource titles and the word distributions of the resource texts between two resources are mainly considered to perform the de-duplication.

Here, the de-duplicating the resources associated with the processed persistent topic based on the word distributions of the resources associated with the persistent topic preferably includes: reserving a resource having a higher value score among two resources using a streaming comparison method, when a similarity between the two resources associated with the persistent topic is greater than a preset similarity threshold.

For example, resources A, B, and C are reserved, and resource D is streaming inputted. It is found that D is similar to A, and the value score of D is higher than the value score of A. Then resource D replaces resource A, that is, resource D, B, and C are reserved. The comparison speed may be improved through streaming comparison.

By extracting the word distribution of the persistent topic and the word distribution of the resource respectively, establishing the association relationship between the persistent topic and the resource based on the word distributions of the persistent topic and the resource, the technical solution of the present embodiment can timely link the newly added resource to the persistent topic and promptly push the newly added resource to the user. By de-duplicating the resources associated with persistent topic after establishing the association relationships between the persistent topic and the resources, the speed of de-duplication may be improved.

Embodiment 5

Figure 10:
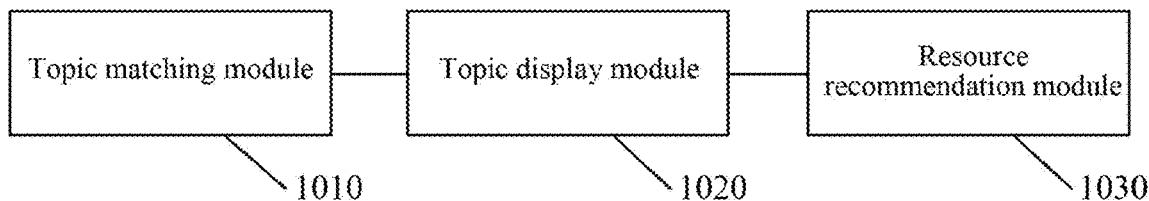
FIG. 10 is a schematic structural diagram of an apparatus for subscribing to a topic according to Embodiment 5 of the present disclosure.

FIG. 10 is a schematic structural diagram of an apparatus for subscribing to a topic according to Embodiment 5 of the present disclosure. As shown in FIG. 10, the apparatus for subscribing to a topic according to the present embodiment includes: a topic matching module 1010, a topic display module 1020 and a resource recommendation module 1030.

The topic matching module 1010 is configured to match a persistent topic for a retrieval keyword based on the retrieval keyword of a user combined with at least one of historical behavior or a subscription record of the user.

The topic display module 1020 is configured to return the persistent topic to a client for display, for the user to subscribe.

The resource recommendation module 1030 is configured to save the persistent topic subscribed by the user, and recommend an updated matching resource to the user when a matching resource corresponding to the persistent topic subscribed by the user is update.

Preferably, the apparatus further includes: a topic recommendation module, configured to determine persistent topic to be recommended to the user based on the historical behavior and a subscription behavior for the persistent topic of the user, and recommend the persistent topic to the user.

Preferably, the apparatus further includes: a matching resource display module, configured to query a corresponding matching resource in a pre-established persistent topic retrieval library, and return the matching resource to the client for display, upon receiving a persistent topic clicked by the user, where the persistent topic retrieval library includes an association relationship between a persistent topic and a matching resource between persistent topics and matching resources.

Preferably, the matching resource display module includes: a matching resource query unit, configured to query the corresponding matching resource in the pre-established persistent topic retrieval library, upon receiving the persistent topic clicked by the user; a matching resource sorting unit, configured to sort the matching resource based on a click record and a resource attribute of the matching resource, and the historical behavior of the user; and a matching resource recommendation unit, configured to return the matching resource to the client for display according to a sorting result.

Preferably, the topic matching module includes: a topic determination unit, configured to determine the persistent topic for the retrieval keyword based on the retrieval keyword of the user combined with at least one of the historical behavior or the subscription record of the user; and a topic sorting unit, configured to sort the persistent topic based on a click record of the persistent topic and the historical behavior of the user.

Preferably, the apparatus further includes: a topic mining module, configured to mine a user query meeting a preset condition as the persistent topic, based on a user retrieval log, before the matching a persistent topic to a retrieval keyword based on the retrieval keyword of the user combined with at least one of historical behavior or a subscription record of the user; a resource mining module, configured to establish a resource library based on a pre-configured website and a click resource of the persistent topic; and a topic resource association module, configured to establish an association between the persistent topic and a resource in the resource library, and store the association into a persistent topic retrieval library.

The preset condition preferably includes at least one of: the user query being continuously searched for a second preset number of days by over a preset number of people within a first preset number of days, or the user query including a preset keyword.

Preferably, the topic mining module includes: an original resource acquisition unit, configured to acquire a resource in the pre-configured website and the click resource of the persistent topic as original resources; a resource literal de-duplication unit, configured to de-duplicate original resources having a consistent literal content based on titles and texts of the original resources, to obtain a resource; a resource attribute extraction unit, configured to extract a resource attribute of the resource, the resource attribute including a title, a summary, a map, and a value score; and a resource library establishing unit, configured to store the resource and the corresponding resource attribute into the resource library.

Preferably, the topic resource association module includes: a word distribution extraction unit, configured to extract a word distribution of the persistent topic and a word distribution of the resource respectively, a statistical corpus of the persistent topic including the click resource of the persistent topic and a resource having a title containing the persistent topic in the resource library; a topic processing unit, configured to de-duplicate and cluster persistent topics based on word distributions and word-embedding characteristics of the persistent topics; a topic resource association unit, configured to establish an association relationship between the processed persistent topic and the resource, and store the association relationship into the persistent topic retrieval library; and a resource word distribution de-duplication unit, configured to de-duplicate resources associated with the processed persistent topic based on word distributions of the resources associated with the persistent topic.

Preferably, the topic processing unit is specifically configured to: calculate a similarity between the persistent topics based on word distributions and word-embedding characteristics of the persistent topics; reserve a persistent topic among persistent topics having similarities greater than a first preset threshold; and classify persistent topics having the similarities greater than a second preset threshold and less than or equal to the first preset threshold into a category.

Preferably, the topic resource association unit is specifically configured to: establish an inverted index for a word distribution of the processed persistent topic; determine a candidate persistent topic corresponding to the resource based on the word distribution of the resource and the inverted index; calculate a similarity between a word distribution of a text of the resource and a word distribution of the candidate persistent topic; and define a candidate persistent topic having the similarity greater than a preset threshold as the persistent topic associated with the resource, and store the persistent topic into the persistent topic retrieval library.

Preferably, the resource word distribution de-duplication unit is specifically configured to: reserve a resource having a higher value score among two resources using a streaming comparison method, when a similarity between the two resources associated with the persistent topic is greater than a preset similarity threshold.

The above product may perform the method provided by any embodiment of the present disclosure, and has the corresponding functional modules and beneficial effects for performing the method.

Embodiment 6

Embodiment 6 of the present disclosure provides a server, including the apparatus for subscribing to a topic provided by any embodiment of the present disclosure.

Figure 11:
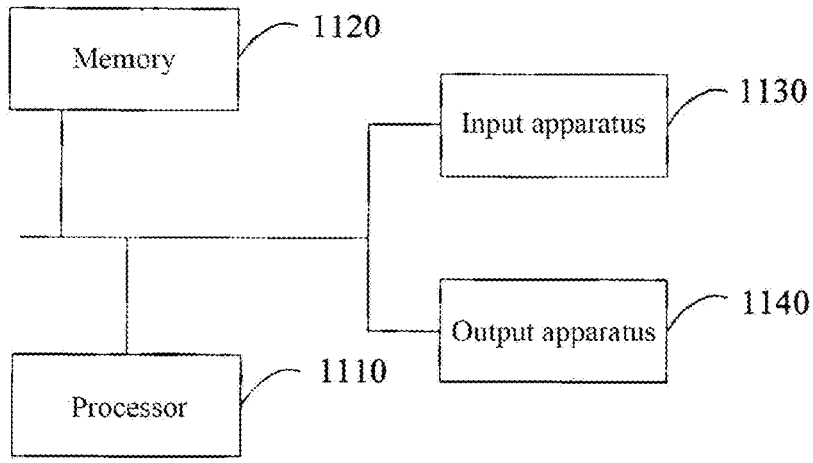
FIG. 11 is a schematic structural diagram of a server according to Embodiment 6 of the present disclosure.

Specifically, as shown in FIG. 11, an embodiment of the present disclosure provides a server. The server includes a processor 1110, a memory 1120, an input apparatus 1130, and an output apparatus 1140. The number of processors 1110 in the server may be one or multiple. In FIG. 11, one processor 1110 is used as an example. The processor 1110, the memory 1120, the input apparatus 1130, and the output apparatus 1140 in the server may be connected via a bus or by other means. FIG. 11 shows the example of connecting via a bus.

The memory 1120 as a computer readable storage medium, may be used to store a software program, a computer executable program, and a module, such as a program instruction/module corresponding to the method for subscribing to a topic in the embodiments of the present disclosure (for example, the topic matching module 1010, the topic display module 1020 and the resource recommendation module 1030 in the apparatus for subscribing to a topic). The processor 1110 executes various functional applications and data processing of the server by running software programs, instructions, and modules stored in the memory 1120, that is, implementing the above method for subscribing to a topic.

The memory 1120 may mainly include a storage program area and a storage data area. The storage program area may store an operating system, at least one feature required application. The storage data area may store data created according to the use of the server, and the like. Moreover, the memory 1120 may include high speed random access memory, and may also include non-volatile memory, such as at least one magnetic disk storage device, flash memory device, or other non-volatile solid storage devices. In some examples, the memory 1120 may further include memories remotely located relative to the processor 1110, which may be connected to the server via the network. Examples of the network include, but are not limited to, the Internet, intranets, local area networks, mobile communication networks, and combinations thereof.

The input apparatus 1130 may be used to receive input numeric or character information and to generate key signal inputs related to user settings and function control of the server. The output apparatus 1140 may include a display device such as a display screen.

The embodiments of the present disclosure further provide a storage medium containing computer executable instructions, the computer executable instructions, when executed by a computer processor, are for implementing a method for subscribing to a topic, the method including: matching a persistent topic for a retrieval keyword based on the retrieval keyword of a user combined with at least one of historical behavior or a subscription record of the user; returning the persistent topic to a client for display, for the user to subscribe; and saving the persistent topic subscribed by the user, and recommending an updated matching resource to the user when a matching resource corresponding to the persistent topic subscribed by the user is updated.

In the above solution, other computer executable instructions may also be included, which are specifically used to execute the steps of the method for subscribing to a topic provided by the embodiments of the present disclosure when the computer processor executes.

Through the above description of the embodiments, those skilled in the art may clearly understand that the present disclosure may be implemented by software and necessary general hardware, and may also be implemented by hardware, but in many cases, the former is a better implementation. Based on such understanding, the technical solution of the present disclosure may be embodied in the form of a software product in essence or in part contributing to the prior art. The computer software product may be stored in a computer readable storage medium, such as a computer floppy disk, read-only memory (ROM), random access memory (RAM), flash memory (FLASH), hard disk or optical disk, etc., including a number of instructions to make a computer device (may be a personal computer, server, or a network device or the like) to perform the method described in the various embodiments of the present disclosure.

It should be noted that in the embodiment of the above apparatus for subscribing to a topic, each unit and module included in the apparatus is only divided according to the functional logic. However, it is not limited to the above-mentioned division, as long as the corresponding function can be implemented. In addition, the specific names of the respective functional units are only for the purpose of facilitating mutual differentiation, and are not intended to limit the scope of the present disclosure.

The above is only the specific embodiments of the present disclosure, but the scope of the present disclosure is not limited thereto, and any change or replacement that is easily conceivable by those skilled in the art within the technical scope of the present disclosure should be covered by the scope of the present disclosure. Therefore, the scope of the present disclosure should be determined by the scope of the appended claims.

What is claimed is:

1. A method for subscribing to a topic, the method comprising:
    matching a persistent topic for a retrieval keyword based on the retrieval keyword of a user combined with at least one of historical behavior or a subscription record of the user;
    returning the persistent topic to a client for display, for the user to subscribe; and
    saving the persistent topic subscribed by the user;
    acquiring an updated resource from a website;
    associating the updated resource with a library topic in a pre-established persistent topic resource library, and storing the updated resource and an association between the library topic and the updated resource in the persistent topic resource library;
    determining that the persistent topic subscribed by the user matches the library topic, and determining the updated resource as an updated matching resource; and
    recommending the updated matching resource to the user, wherein before matching the persistent topic for the retrieval keyword based on the retrieval keyword of the user combined with the at least one of historical behavior or the subscription record of the user, the method further comprises:
    mining a user query meeting a preset condition as the persistent topic, based on a user retrieval log;
    establishing the persistent topic resource library based on the website and a click resource of the persistent topic; and
    establishing an association between the persistent topic and a resource in the resource library, and storing the association into the persistent topic retrieval library;
    wherein the establishing the resource library based on the website and a click resource of the persistent topic comprises:
    acquiring a resource in the website and the click resource of the persistent topic as original resources;

de-duplicating original resources having a consistent literal content based on titles and texts of the original resources, to obtain a resource;

extracting a resource attribute of the resource, the resource attribute comprising a title, a summary, a map, and a value score; and storing the resource and the corresponding resource attribute into the resource library.

2. The method according to claim 1, further comprising:
determining a persistent topic to be recommended to the user based on the historical behavior and a subscription behavior for the persistent topic of the user, and recommending the persistent topic to the user.

3. The method according to claim 1, further comprising:
querying the corresponding matching resource in a pre-established persistent topic retrieval library, and returning the matching resource to the client for display, upon receiving a persistent topic clicked by the user, wherein the persistent topic retrieval library comprises an association relationship between a persistent topic and a matching resource.

4. The method according to claim 3, wherein the querying a corresponding matching resource in the pre-established persistent topic retrieval library, and returning the matching resource to the client for display, upon receiving a persistent topic clicked by the user comprises:

querying the corresponding matching resource in the pre-established persistent topic retrieval library, upon receiving the persistent topic clicked by the user;

sorting the matching resource based on a click record and a resource attribute of the matching resource, and the historical behavior of the user; and returning the matching resource to the client for display according to a sorting result.

5. The method according to claim 1, wherein the matching a persistent topic for a retrieval keyword based on the retrieval keyword of a user combined with at least one of historical behavior or a subscription record of the user comprises:

determining the persistent topic for the retrieval keyword based on the retrieval keyword of the user combined with at least one of the historical behavior or the subscription record of the user; and sorting the persistent topic based on a click record of the persistent topic and the historical behavior of the user.

6. The method according to claim 1, wherein the preset condition comprises at least one of: the user query being continuously searched for a second preset number of days by over a preset number of people within a first preset number of days, or the user query comprising a preset keyword.

7. The method according to claim 1, wherein the establishing an association between the persistent topic and a resource in the resource library, and storing the association into the persistent topic retrieval library comprises:

extracting a word distribution of the persistent topic and a word distribution of the resource respectively, a statistical corpus of the persistent topic comprising the click resource of the persistent topic and a resource having a title containing the persistent topic in the resource library;

de-duplicating and clustering persistent topics based on word distributions and word-embedding characteristics of the persistent topics;

establishing an association relationship between the processed persistent topic and the resource, and storing the association relationship into the persistent topic retrieval library; and de-duplicating resources associated with the processed persistent topic based on word distributions of the resources associated with the persistent topic.

8. The method according to claim 7, wherein the de-duplicating and clustering persistent topics based on word distributions and word-embedding characteristics of the persistent topics comprises:

calculating a similarity between the persistent topics based on word distributions and word-embedding characteristics of the persistent topics;

reserving a persistent topic among persistent topics having similarities greater than a first preset threshold; and classifying persistent topics having the similarities greater than a second preset threshold and less than or equal to the first preset threshold into a category.

9. The method according to claim 7, wherein the establishing an association relationship between the processed persistent topic and the resource, and storing the association relationship into the persistent topic retrieval library comprises:

establishing an inverted index for a word distribution of the processed persistent topic;

determining a candidate persistent topic corresponding to the resource based on the word distribution of the resource and the inverted index;

calculating a similarity between a word distribution of a text of the resource and a word distribution of the candidate persistent topic; and defining a candidate persistent topic having the similarity greater than a preset threshold as the persistent topic associated with the resource, and storing the persistent topic into the persistent topic retrieval library.

10. The method according to claim 7, wherein the de-duplicating the resources associated with the processed persistent topic based on the word distributions of the resources associated with the persistent topic comprises:

reserving a resource having a higher value score among two resources using a streaming comparison method, when a similarity between the two resources associated with the persistent topic is greater than a preset similarity threshold.

11. An apparatus for subscribing to a topic, the apparatus comprising:

at least one processor; and a memory storing instructions, the instructions when executed by the at least one processor, cause the at least one processor to perform operations, the operations comprising:

matching a persistent topic for a retrieval keyword based on the retrieval keyword of a user combined with at least one of historical behavior or a subscription record of the user;

returning the persistent topic to a client for display, for the user to subscribe; and saving the persistent topic subscribed by the user;

acquiring an updated resource from a website;

associating the updated resource with a library topic in a pre-established persistent topic resource library, and storing the updated resource and an association between the library topic and the updated resource in the persistent topic resource library;

determining that the persistent topic subscribed by the user matches the library topic, and determine the updated resource as an updated matching resource; and recommending the updated matching resource to the users, wherein before matching the persistent topic for the retrieval keyword based on the retrieval keyword of the user combined with the at least one of historical behavior or the subscription record of the user, the method further comprises:

mining a user query meeting a preset condition as the persistent topic, based on a user retrieval log;

establishing the persistent topic resource library based on the website and a click resource of the persistent topic; and establishing an association between the persistent topic and a resource in the resource library, and storing the association into the persistent topic retrieval library;

wherein the establishing the resource library based on the website and a click resource of the persistent topic comprises:

acquiring a resource in the website and the click resource of the persistent topic as original resources;

de-duplicating original resources having a consistent literal content based on titles and texts of the original resources, to obtain a resource;

extracting a resource attribute of the resource, the resource attribute comprising a title, a summary, a map, and a value score; and storing the resource and the corresponding resource attribute into the resource library.

12. The apparatus according to claim 11, the operations further comprising:

determining a persistent topic to be recommended to the user based on the historical behavior and a subscription behavior for the persistent topic of the user, and recommending the persistent topic to the user.

13. The apparatus according to claim 11, the operations further comprising:

querying a corresponding matching resource in the pre-established persistent topic retrieval library, and returning the matching resource to the client for display, upon receiving a persistent topic clicked by the user, wherein the persistent topic retrieval library comprises an association relationship between a persistent topic and a matching resource.

14. The apparatus according to claim 13, wherein the querying a corresponding matching resource in the pre-established persistent topic retrieval library, and returning the matching resource to the client for display, upon receiving the persistent topic clicked by the user comprises:

querying the corresponding matching resource in the pre-established persistent topic retrieval library, upon receiving the persistent topic clicked by the user;

sorting the matching resource based on a click record and a resource attribute of the matching resource, and the historical behavior of the user; and returning the matching resource to the client for display according to a sorting result.

15. The apparatus according to claim 11, wherein the matching a persistent topic for a retrieval keyword based on the retrieval keyword of a user combined with at least one of historical behavior or a subscription record of the user comprises:

determining the persistent topic for the retrieval keyword based on the retrieval keyword of the user combined with at least one of the historical behavior or the subscription record of the user; and sorting the persistent topic based on a click record of the persistent topic and the historical behavior of the user.

16. The apparatus according to claim 11, wherein the preset condition comprises at least one of: the user query being continuously searched for a second preset number of days by over a preset number of people within a first preset number of days, or the user query comprising a preset keyword.

17. The apparatus according to claim 11, wherein the establishing an association between the persistent topic and a resource in the resource library, and storing the association into the persistent topic retrieval library comprises:

extracting a word distribution of the persistent topic and a word distribution of the resource respectively, a statistical corpus of the persistent topic comprising the click resource of the persistent topic and a resource having a title containing the persistent topic in the resource library;

de-duplicating and clustering persistent topics based on word distributions and word-embedding characteristics of the persistent topics;

establishing an association relationship between the processed persistent topic and the resource, and store the association relationship into the persistent topic retrieval library; and de-duplicating resources associated with the processed persistent topic based on word distributions of the resources associated with the persistent topic.

18. The apparatus according to claim 17, wherein the de-duplicating and clustering persistent topics based on word distributions and word-embedding characteristics of the persistent topics comprises:

calculating a similarity between the persistent topics based on word distributions and word-embedding characteristics of the persistent topics;

reserving a persistent topic among persistent topics having similarities greater than a first preset threshold; and classifying persistent topics having the similarities greater than a second preset threshold and less than or equal to the first preset threshold into a category.

19. The apparatus according to claim 17, wherein the establishing an association relationship between the processed persistent topic and the resource, and storing the association relationship into the persistent topic retrieval library comprises:

establishing an inverted index for a word distribution of the processed persistent topic;

determining a candidate persistent topic corresponding to the resource based on the word distribution of the resource and the inverted index;

calculating a similarity between a word distribution of a text of the resource and a word distribution of the candidate persistent topic; and defining a candidate persistent topic having the similarity greater than a preset threshold as the persistent topic associated with the resource, and store the persistent topic into the persistent topic retrieval library.

20. The apparatus according to claim 17, wherein the de-duplicating the resources associated with the processed persistent topic based on the word distributions of the resources associated with the persistent topic comprises:

reserving a resource having a higher value score in among two resources using a streaming comparison method, when a similarity between the two resources associated with the persistent topic is greater than a preset similarity threshold.

21. A non-transitory computer storage medium storing a computer program, the computer program when executed by one or more processors, causes the one or more processors to perform operations, the operations comprising:

matching a persistent topic for a retrieval keyword based on the retrieval keyword of a user combined with at least one of historical behavior or a subscription record of the user;

returning the persistent topic to a client for display, for the user to subscribe; and saving the persistent topic subscribed by the user;

acquire an updated resource from a website;

associate the updated resource with a library topic in a pre-established persistent topic resource library, and storing the updated resource and an association between the library topic and the updated resource in the persistent topic resource library;

determine that the persistent topic subscribed by the user matches the library topic, and determine the updated resource as an updated matching resource; and recommending the updated matching resource to the user, wherein before matching the persistent topic for the retrieval keyword based on the retrieval keyword of the user combined with the at least one of historical behavior or the subscription record of the user, the method further comprises:

mining a user query meeting a preset condition as the persistent topic, based on a user retrieval log;

establishing the persistent topic resource library based on the website and a click resource of the persistent topic; and establishing an association between the persistent topic and a resource in the resource library, and storing the association into the persistent topic retrieval library;

wherein the establishing the resource library based on the website and a click resource of the persistent topic comprises:

acquiring a resource in the website and the click resource of the persistent topic as original resources;

de-duplicating original resources having a consistent literal content based on titles and texts of the original resources, to obtain a resource;

extracting a resource attribute of the resource, the resource attribute comprising a title, a summary, a map, and a value score; and storing the resource and the corresponding resource attribute into the resource library.

\* \* \* \* \*